April 26, 1955
H. LE BLANC
2,706,868
FISHING LURE
Filed April 4, 1952
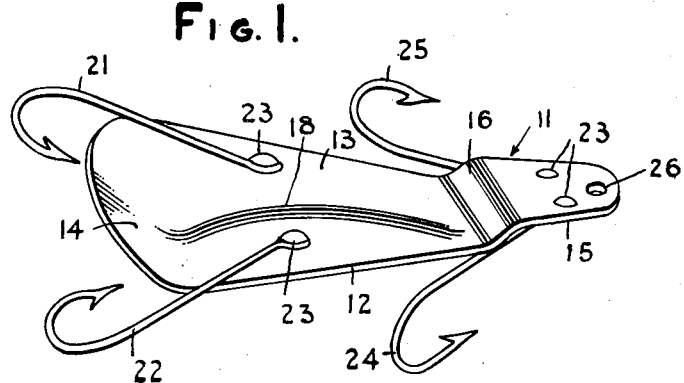
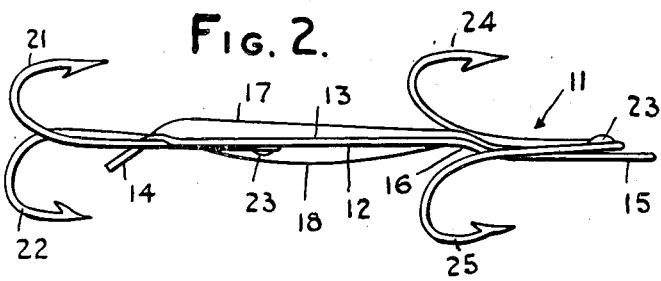
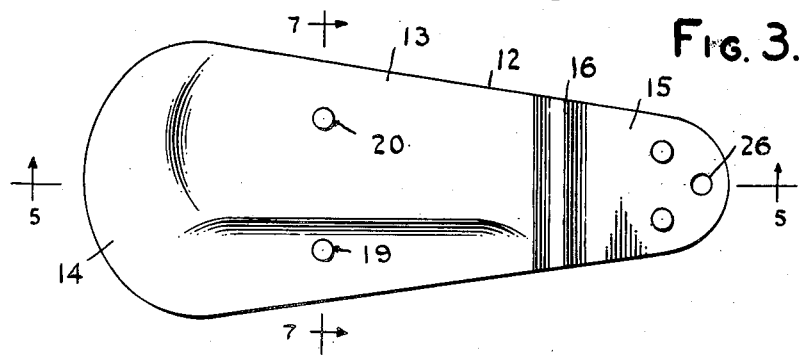
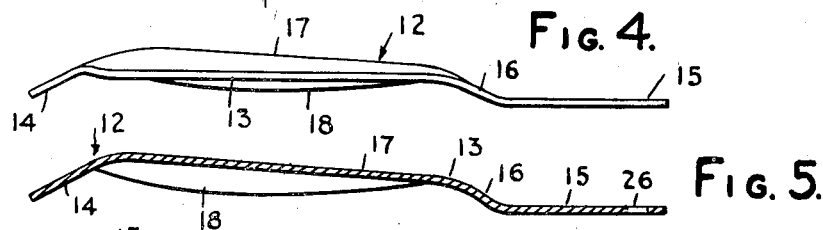
INVENTOR
HOMER LeBLANC,
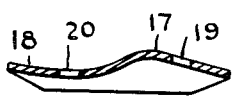
BY
McMorrow, Berman + Davidson
ATTORNEY

United States Patent Office 2,706,868
Patented Apr. 26, 1955

2,706,868

FISHING LURE

Homer Le Blanc, St. Clair Shores, Mich.

Application April 4, 1952, Serial No. 280,470

2 Claims. (Cl. 43—42.52)

This invention relates to fishing lures, and more particularly to an improved fishing lure of the spoon type for use in trolling and similar types of fishing.

The main object of the invention is to provide a novel and improved fish lure for use in casting or trolling, said lure being simple in construction, being inexpensive to manufacture, and having substantial advantages over lures hitherto employed in that it provides unusual swimming and diving actions.

A further object of the invention is to provide an improved fishing lure particularly suitable for casting or trolling which is sturdy in construction, which is easy to use, and which combines a combination of swimming, wobbling and darting action, superior to the action obtained with the ordinary "spinner" type of lure, and having fixed hooks which provide more positive hooking action than that obtainable with lures wherein the hooks are loosely secured to the main body of the lures.

Further objects and advantages of the invention will become apparent from the following description and claims, and from the accompanying drawings, wherein:

Figure 1 is a perspective view of an improved fishing lure constructed in accordance with the present invention, the lure being shown in an inverted position.

Figure 2 is a side elevational view of the fishing lure of Figure 1.

Figure 3 is a top view of the main body of the lure, the hooks being detached therefrom.

Figure 4 is a side elevational view of the lure body of Figure 3.

Figure 5 is a longitudinal cross sectional view taken on the line 5—5 of Figure 3.

Figure 6 is an end elevational view of the lure body of Figure 3.

Figure 7 is a vertical transverse cross sectional view taken on the line 7—7 of Figure 3.

Referring to the drawings, the illustrated lure designated generally 11 comprises a plate 12 of thin rigid sheet material having a spoon portion 13 which tapers in width from its rear end toward its forward end, as shown in Figure 3. The rear end of the spoon portion 13 is formed with a downwardly and rearwardly declining flange 14, said flange having a smoothly rounded arcuate periphery. On the forward end of the plate 12 is a downwardly offset flange 15 which is parallel to the spoon portion 13 and is integrally connected thereto by the offset 16. The spoon portion 13 is sinuously curved in transverse cross section, as shown in Figure 7, and includes the downwardly concaved longitudinal area 17 and the upwardly concaved longitudinal area 18 merging with the area 17, as clearly shown in Figure 7. The spoon portion 13 is formed with the laterally spaced apertures 19 and 20, and rigidly secured to the body at said apertures are the respective hooks 21 and 22, said hooks being located at the underside of the plate 12 and being connected to the plate 12 by suitable fasteners, such as the rivets 23. The hook 21 being positioned with its barb directed upwardly whereas the hook 22 is positioned with its barb directed downwardly, as shown in Figure 2. Secured to the upper side of the front flange 15 of the lure in a similar manner are the respective laterally spaced hooks 24 and 25, the barb of the hook 24 being directed upwardly and the barb of the hook 25 being directed downwardly, as shown in Figure 2, the hook 25 extending above the same side of the lure as the hook 21 and the hook 24 extending below the same side of the lure as the hook 22. The end of the front flange 15 is formed with an aperture 26 which may be secured to the end of a fishing line.

In using the device, the lure is drawn through the water and provides a smooth swimming action when trolled or reeled in at a normal speed. The lure also executes a wobbling action, causing it to oscillate around its longitudinal axis, because of the corrugated shape of the spoon portion 13, said wobbling action being accentuated because of the gradually decreasing depth of the concave-convex areas 20 and 19, as is clearly seen in Figures 4 and 5. By jerking the line the lure will execute a darting action, and will furthermore execute a diving action responsive to a sudden pull on the fishing line. The darting or diving action is produced by the reaction of the declining flange 14 with respect to the water when the forward motion of the lure through the water is accelerated.

While a specific embodiment of an improved fishing lure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fishing lure, an elongated generally thin plate comprising a spoon portion having front and rear ends and straight forwardly converging side edges, a front flange on the front end of said portion, said front flange being downwardly offset from and lying parallel to a plane defined by the straight converging side edges of said spoon portion, a rear flange on the rear end of said spoon portion, said rear flange declining rearwardly relative to the spoon portion, a first pair of laterally spaced rearwardly extending hooks fixed on the upper side of said front flange, and a second pair of rearwardly extending hooks fixed on the under side of said spoon portion at a point forwardly of the rear end of said spoon portion, there being means on said front flange for the attachment thereto of a fish line.

2. In a fishing lure, an elongated generally thin plate comprising a spoon portion having front and rear ends and straight forwardly converging side edges, a front flange on the front end of said portion, said front flange being downwardly offset from and lying parallel to a plane defined by the straight converging side edges of said spoon portion, a rear flange on the rear end of said spoon portion, said rear flange declining rearwardly relative to the spoon portion, a first single pair of laterally spaced rearwardly extending hooks fixed on the upper side of said front flange, and a second single pair of rearwardly extending hooks fixed on the underside of said spoon portion at a point forwardly of the rear end of said spoon portion, said pairs of hooks being rigid relative to the lure and the hooks of each pair having barbs reversed with respect to each other, there being means on said front flange for the attachment thereto of a fish line.

References Cited in the file of this patent

UNITED STATES PATENTS

| 836,038 | Hipp | Nov. 13, 1906 |
|---|---|---|
| 1,326,821 | Ackerman | Dec. 30, 1919 |
| 1,422,457 | McClanahan | July 11, 1922 |
| 1,803,056 | Davis | Apr. 28, 1931 |
| 1,836,372 | Jordan | Dec. 15, 1931 |
| 1,883,695 | Golrke | Oct. 18, 1932 |
| 1,903,558 | Taylor | Apr. 11, 1933 |
| 1,938,653 | Bardon | Dec. 12, 1933 |
| 2,164,415 | Mallett | July 4, 1936 |
| 2,500,707 | Rosinski | Mar. 14, 1950 |
| 2,547,264 | Helman et al. | Apr. 3, 1951 |